(No Model.)
R. H. THURSTON.
MACHINE FOR TESTING LUBRICANTS.
No. 332,974. Patented Dec. 22, 1885.
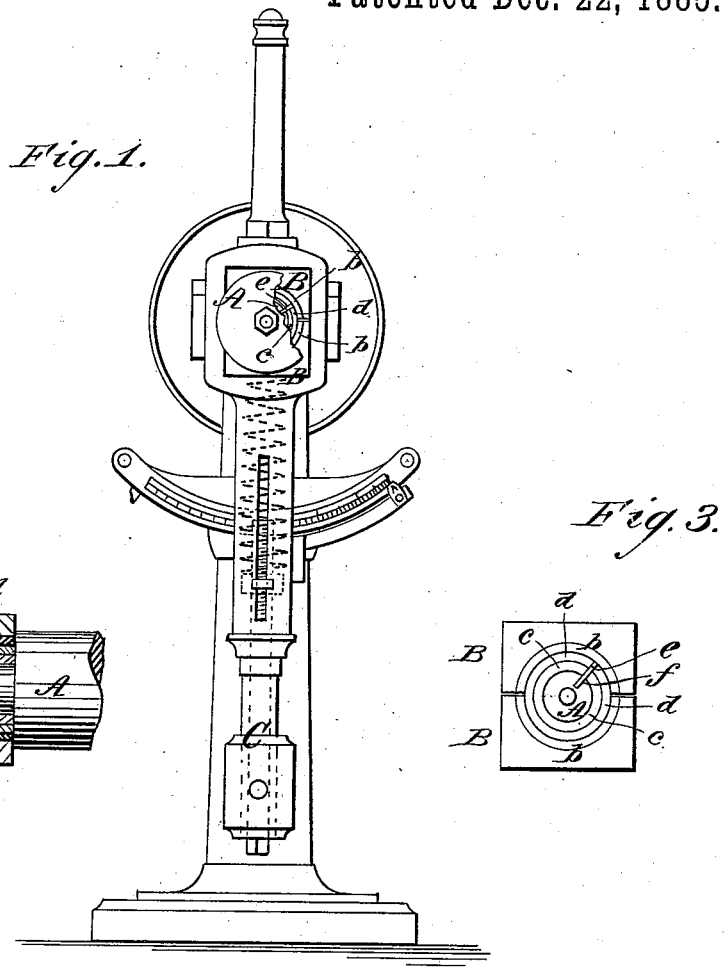
Fig. 1.
Fig. 2.
Fig. 3.
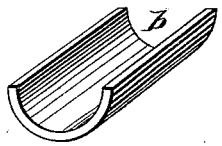
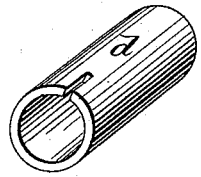
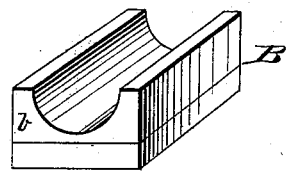
Fig. 5. Fig. 6. Fig. 4.
WITNESSES:
Dom Turtchell.
C. Sedgwick
INVENTOR:
R. H. Thurston
BY Munn & Co.
ATTORNEYS.

United States Patent Office.

ROBERT H. THURSTON, OF HOBOKEN, NEW JERSEY.

MACHINE FOR TESTING LUBRICANTS.

SPECIFICATION forming part of Letters Patent No. 332,974, dated December 22, 1885.

Application filed May 19, 1885. Serial No. 165,321. (No model.)

*To all whom it may concern:*

Be it known that I, ROBERT H. THURSTON, of Hoboken, in the county of Hudson and State of New Jersey, have invented a new and Improved Machine for Testing Lubricants, of which the following is a full, clear, and exact description.

My invention, as in that for which Letters Patent No. 230,158 were issued to me July 20, 1880, has reference to that class of machines in which the lubricant to be tested is placed upon a revolving journal held or pressed by "brasses."

The present invention not only accomplishes the same objects as the patented one above cited—namely, making the testing-journal independent of its rotating shaft, securing this independent journal to the shaft by means that shall permit it to be readily removed, and providing against injury to the machine by any sudden or excessive adhesion between the testing-surfaces—but it has another and highly important object, which will be explained by the following statement.

In the testing of oils it is sometimes found that the surfaces of bearings and journals are subject to wear of very observable amount; and it is advisable to be prepared to measure this quantity. For this purpose I make the bearing with a thin removable shell, which, being comparatively light, can be taken out and weighed with great accuracy upon a balance which might be too much loaded to give exact results if loaded with the whole and heavy bearing or brass. I also make the journal, which in some cases, as described in my Letters Patent hereinbefore referred to, is itself a removable shell, with an outer and comparatively thin shell that can also be removed for weighing, if desired.

Reference is to be had to the accompanying drawings, forming a part of this specification, in which similar letters of reference indicate corresponding parts in all the figures.

Figure 1 is a front elevation of the machine. Fig. 2 is an enlarged longitudinal view of the bearing end portion of the shaft to which the lubricant to be tested is applied, with the brasses or bearings and removable shells fitted to the bearings and journal in section. Fig. 3 is an end view of the same with an outer cap-plate removed. Fig. 4 is a view in perspective of a modified construction of one of the brasses with its removable shell applied. Fig. 5 is a perspective view of one of the removable shells designed to be fitted to the brasses; and Fig. 6 a perspective view of the removable outer journal-shell.

A is the rotating shaft, and B B the brasses or bearings for its journal or journal-sleeve. Each of said brasses is fitted internally with a thin removable shell, $b$, which can be readily taken out and weighed when it is necessary to determine the amount of wear with greater accuracy in a balance than could the entire brass. The journal $c$, as in my cited patented invention, is represented as composed of a hollow cylinder, sleeve, or shell whose internal diameter is such as to make it fit closely that part of the shaft upon which it is placed, and whose external diameter is of any desired dimensions. This journal is independent and removable from the shaft, and outside of it is fitted a removable thin shell, $d$, which, as in the case of the removable thin shell in the brass, may be readily removed and weighed with accuracy to determine the amount of wear.

The journal and its outer shell are represented as caused to revolve with the shaft by means of the removable thin locking projection $e$, inserted into slots in the outer ends of the shaft and its shells, to provide for the journal shell or shells being readily slipped off the shaft, as in the case of my previously-patented machine, and for the other purpose or purposes expressed in my hereinbefore referred-to Letters Patent, including the exemption of the machine from accident by the shearing of the projection $e$ by the edge of the recess $f$ in the shaft when the rubbing-surfaces of the journal and its bearings are exposed to an excessive friction, swinging up to an extreme throw the pendulum C of the testing-machine.

By making the shells $b$ of the brasses and the outer shells, $d$, of the journal of any desired materials facility is afforded for determining the amount of friction of different materials when bearing upon and rubbing over each other, and the same can be readily replaced at but little expense; but the great advantage of this invention is the facility which is afforded by the thin shells for measuring the amount of wear of the bearings and journals.

In Fig. 4 the removable shell b, instead of being let into the brass B, is simply seated onto the interior surface of it.

Having thus fully described my invention, I claim as new and desire to secure by Letters Patent—

1. In a machine for testing lubricants, the combination, with the brass or bearing B of the testing-journal of the shaft, of a thin removable shell, b, applied to the interior of said bearing, substantially as and for the purpose herein set forth.

2. In a machine for testing lubricants, the combination, with the rotating shaft A of the machine, of the independent journal c, the outer thin removable shell, d, and the brasses B, essentially as described.

3. In a machine for testing lubricants, the combination, with the rotating shaft A, of a thin removable shell, d, applied to the journal of said shaft, the thin removable shell b, and the bearing or brasses B B, substantially as and for the purposes specified.

ROBERT H. THURSTON.

Witnesses:
DE VOLSON WOOD,
MALCOLM W. NIVEN.